(12) United States Patent
Haywood et al.

(10) Patent No.: US 11,657,007 B2
(45) Date of Patent: May 23, 2023

(54) REMOTE MEMORY SELECTION

(71) Applicant: Rambus Inc., San Jose, CA (US)

(72) Inventors: Christopher Haywood, Cary, NC (US); Evan Lawrence Erickson, Chapel Hill, NC (US)

(73) Assignee: Rambus Inc., San Jose, CA (US)

( * ) Notice: Subject to any disclaimer, the term of this patent is extended or adjusted under 35 U.S.C. 154(b) by 21 days.

(21) Appl. No.: 17/333,420

(22) Filed: May 28, 2021

(65) Prior Publication Data

US 2021/0390066 A1 Dec. 16, 2021

Related U.S. Application Data

(60) Provisional application No. 63/039,088, filed on Jun. 15, 2020.

(51) Int. Cl.
*G06F 13/16* (2006.01)
*G06F 12/02* (2006.01)

(52) U.S. Cl.
CPC ........ *G06F 13/1668* (2013.01); *G06F 12/023* (2013.01); *G06F 2212/1044* (2013.01)

(58) Field of Classification Search
None
See application file for complete search history.

(56) References Cited

U.S. PATENT DOCUMENTS

| | | |
|---|---|---|
| 5,687,370 A | 11/1997 | Garst et al. |
| 6,871,219 B2 | 3/2005 | Noordergraaf et al. |
| 7,103,640 B1 | 9/2006 | Overton et al. |
| 7,233,978 B2 | 6/2007 | Overton et al. |
| 7,814,170 B2 | 10/2010 | Overton et al. |
| 8,082,400 B1 | 12/2011 | Chang et al. |
| 8,291,426 B2 | 10/2012 | Gustafsson et al. |
| 8,583,616 B2 * | 11/2013 | Chatley ............... H04L 67/1021 707/609 |
| 9,009,384 B2 | 4/2015 | Nathuji et al. |
| 9,075,735 B2 * | 7/2015 | Tomlinson ............ H04L 41/145 |
| 9,075,935 B2 * | 7/2015 | Vasudevan .............. G06F 30/00 |
| 9,626,108 B2 * | 4/2017 | Stabrawa ................ G06F 12/08 |
| 9,648,081 B2 | 5/2017 | Raikin et al. |

(Continued)

OTHER PUBLICATIONS

Pinto, Christian et al., "Teleporting Memory Across Two Servers", IBM Research Blog, IBM Research Europe, Aug. 2020, https://www.ibm.com/blogs/research/2020/08/teleporting-memory-across-two-servers/, 11 pages.

*Primary Examiner* — Michael Sun
(74) *Attorney, Agent, or Firm* — The Neudeck Law Firm, LLC

(57) ABSTRACT

A multi-path fabric interconnected system with many nodes and many communication paths from a given source node to a given destination node. A memory allocation device on an originating node (local node) requests an allocation of memory from a remote node (i.e., requests a remote allocation). The memory allocation device on the local node selects the remote node based on one or more performance indicators. The local memory allocation device may select the remote node to provide a remote allocation of memory based on one or more of: latency, availability, multi-path bandwidth, data access patterns (both local and remote), fabric congestion, allowed bandwidth limits, maximum latency limits, and, available memory on remote node.

20 Claims, 7 Drawing Sheets

(56) References Cited

U.S. PATENT DOCUMENTS

| | | |
|---|---|---|
| 9,836,217 B2 | 12/2017 | Stabrawa et al. |
| 10,509,738 B2 | 12/2019 | Guim Bernat et al. |
| 2019/0347125 A1* | 11/2019 | Sankaran ............ G06F 9/30087 |
| 2020/0210069 A1* | 7/2020 | Singh .................. G06F 13/4265 |

* cited by examiner

RECEIVE, VIA FIRST INTERFACE AND FROM A FIRST PROCESSOR THAT IS LOCAL WITH RESPECT TO A FIRST MEMORY ALLOCATION DEVICE, A FIRST REQUEST, THE FIRST REQUEST TO BE FULFILLED BY ONE OF A FIRST ALLOCATION OF PHYSICAL MEMORY THAT IS LOCAL WITH RESPECT TO THE FIRST PROCESSOR AND A SECOND ALLOCATION THAT IS NOT LOCAL WITH RESPECT TO THE FIRST PROCESSOR
302

BASED ON A FIRST PERFORMANCE INDICATOR, SELECT A SECOND MEMORY ALLOCATION DEVICE THAT IS NOT LOCAL WITH RESPECT TO THE FIRST PROCESSOR TO PROVIDE THE SECOND ALLOCATION OF MEMORY
304

*FIG. 3*

```
┌─────────────────────────────────────────────┐
│  RECEIVE, VIA A FIRST INTERFACE AND FROM A FIRST │
│  PROCESSOR THAT IS LOCAL WITH RESPECT TO A MEMORY │
│  ALLOCATION DEVICE, A FIRST REQUEST, THE FIRST │
│  REQUEST TO BE FULFILLED BY ONE OF A FIRST   │
│  ALLOCATION OF PHYSICAL MEMORY THAT IS LOCAL WITH │
│  RESPECT TO THE FIRST PROCESSOR AND A SECOND │
│  ALLOCATION THAT IS NOT LOCAL WITH RESPECT TO THE │
│  FIRST PROCESSOR                             │
│  402                                         │
└─────────────────────────────────────────────┘
                      │
┌─────────────────────────────────────────────┐
│  BASED ON A FIRST PERFORMANCE INDICATOR, SELECT A │
│  SECOND MEMORY ALLOCATION DEVICE THAT IS NOT LOCAL │
│  WITH RESPECT TO THE FIRST PROCESSOR TO PROVIDE │
│  THE SECOND ALLOCATION OF MEMORY            │
│  404                                         │
└─────────────────────────────────────────────┘
                      │
┌─────────────────────────────────────────────┐
│  TRANSMIT, VIA A SECOND INTERFACE AND TO THE SECOND │
│  MEMORY ALLOCATION DEVICE, A SECOND REQUEST THAT │
│  IS FOR THE SECOND ALLOCATION OF MEMORY THAT IS │
│  LOCAL WITH RESPECT TO THE SECOND MEMORY    │
│  ALLOCATION DEVICE                           │
│  406                                         │
└─────────────────────────────────────────────┘
                      │
┌─────────────────────────────────────────────┐
│  BASED ON A SECOND PERFORMANCE INDICATOR LOCAL TO │
│  THE SECOND MEMORY ALLOCATION DEVICE, TRANSMIT, BY │
│  THE SECOND MEMORY ALLOCATION DEVICE, A SYSTEM │
│  ADDRESS TO BE USED TO ACCESS THE SECOND    │
│  ALLOCATION OF MEMORY                        │
│  408                                         │
└─────────────────────────────────────────────┘
```

*FIG. 4*

```
┌─────────────────────────────────────────────┐
│ BY A FIRST MEMORY ALLOCATION DEVICE AND FROM A │
│ SECOND MEMORY ALLOCATION DEVICE THAT IS NOT LOCAL │
│   WITH RESPECT TO THE FIRST MEMORY ALLOCATION │
│ DEVICE, RECEIVE A FIRST REQUEST FOR AN ALLOCATION │
│  OF MEMORY THAT IS LOCAL WITH RESPECT TO THE FIRST │
│            MEMORY ALLOCATION DEVICE          │
│                      502                     │
└─────────────────────────────────────────────┘
                      │
┌─────────────────────────────────────────────┐
│ BASED ON A FIRST PERFORMANCE INDICATOR, TRANSMIT, │
│  BY THE FIRST MEMORY ALLOCATION DEVICE AN INDICATOR │
│   THAT THE FIRST MEMORY ALLOCATION DEVICE WILL NOT │
│          PROVIDE THE ALLOCATION OF MEMORY    │
│                      504                     │
└─────────────────────────────────────────────┘
```

*FIG. 5*

REMOTE MEMORY SELECTION

BRIEF DESCRIPTION OF THE DRAWINGS

FIG. 3 is a flowchart illustrating a method of operating memory allocation device.

FIG. 4 is a flowchart illustrating a method of acknowledging a request for a remote memory allocation.

FIG. 5 is a flowchart illustrating a method of declining a request for a remote memory allocation.

DETAILED DESCRIPTION OF THE EMBODIMENTS

Many modern computing systems implement the concept of "virtual memory." Virtual memory allows the address space as seen by a process to appear as a single and contiguous address space when in actuality, the physical locations of data accessed by the process may be fragmentated, segmented, and/or stored in different types of storage (e.g., paged to disk.)

In an embodiment, an operating system's management of the resources used to implement virtual memory is assisted by a hardware memory allocation device. The memory allocation devices of a multi-processing system are interconnected via a load-store type multi-path fabric. The memory allocator devices for each node of the multi-processing system dynamically allocate both local pages of memory that are on a respective node, and remote pages that are on other nodes reachable via the fabric. Because the memory allocation devices handle the necessary address allocation and translation functions, different nodes of the multi-processing system may, for example, concurrently execute different operating system instances.

In a multi-path fabric interconnected system with many nodes, there are many communication paths from a given source node to a given destination node that may be selected. In an embodiment, the memory allocation device on an originating node (local node) requests an allocation of memory from a remote node (i.e., requests a remote allocation). The memory allocation device on the local node selects the remote node based on one or more performance indicators. For example, the local memory allocation device may select the remote node to provide a remote allocation of memory based on one or more of: latency, availability, multi-path bandwidth, data access patterns (both local and remote), fabric congestion, allowed bandwidth limits, maximum latency limits, and, available memory on remote node.

Figure 1:
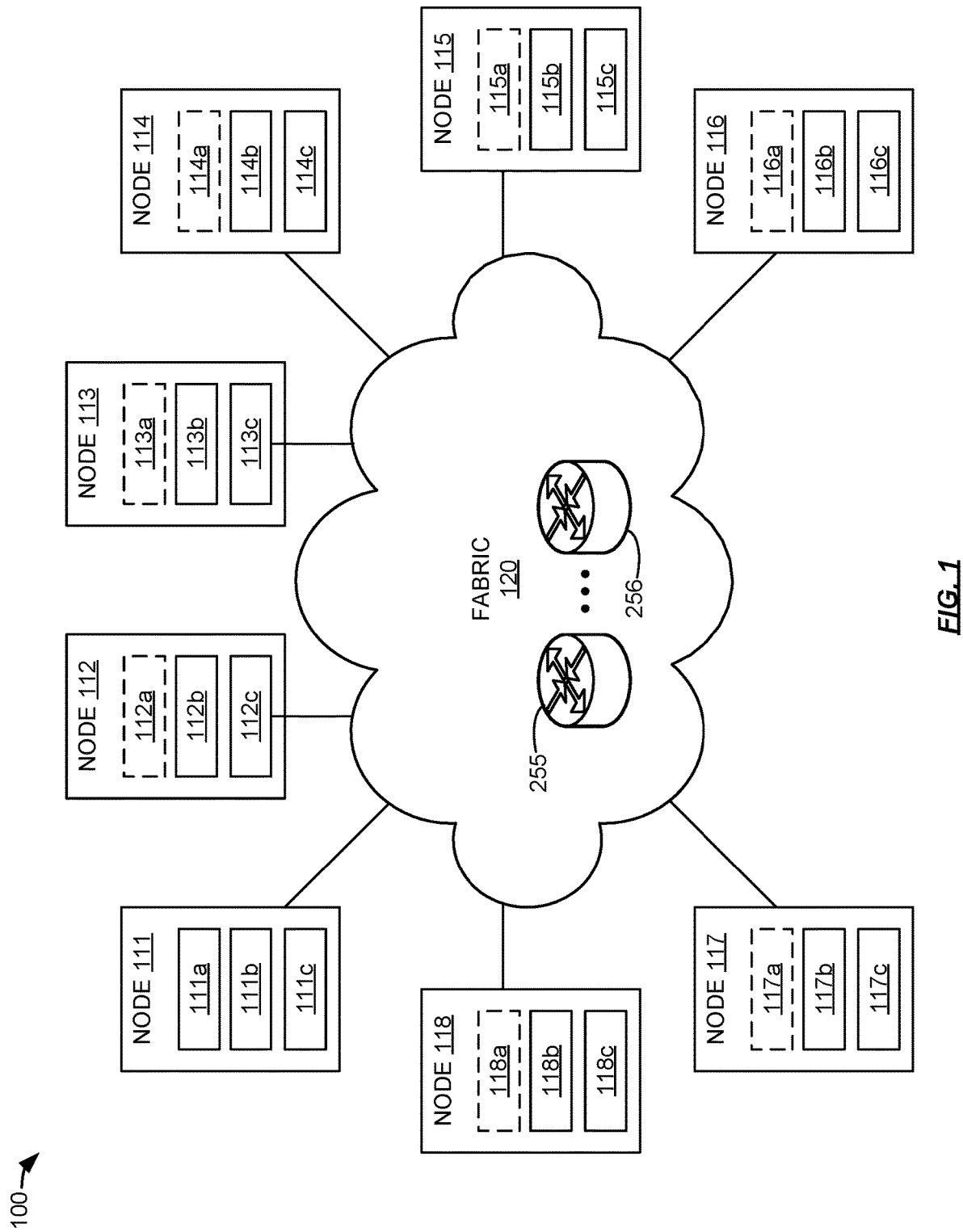
FIG. 1 is a block diagram illustrating a fabric interconnected processing system.

FIG. 1 is a block diagram illustrating a fabric interconnected processing system. In FIG. 1, system 100 comprises system nodes 111-118, and fabric 120. At least one system node 111 includes at least one processor 111a. Other system nodes 112-118 may optionally include at least one processor 112a-118a. Each system node 111-118 includes local physical memory 111b-118b, respectively. Each system node 111-118 also includes a memory allocation device 111c-118c, respectively. Fabric may include one or more switches 255-256. System nodes 111-118 are each operatively coupled to fabric 120. Each of system nodes 111-118 is operatively couple to fabric 120 to communicate and/or exchange information etc. with one or more other system nodes 111-118.

Fabric 120 may be or comprise a switched fabric, point-to-point connections, and/or other interconnect architectures (e.g., ring topologies, crossbars, etc.) Fabric 120 may include links, linking, and/or protocols that are configured to be cache coherent. For example, fabric 120 may use links, linking, and/or protocols that include functionality described by and/or are compatible with one or more of Compute Express Link (CXL), Coherent Accelerator Processor Interface (CAPI), and Gen-Z standards, or the like. In an embodiment, system nodes 111-118 are operatively coupled to fabric 120 to load and/or store information from/to memory 111b-118b that resides within other system nodes 111-118.

Each processor 111a-118a (if present) of a respective system node 111-118 is operatively coupled to its respective memory 111b-118b, respective memory allocation device 111c-118c, and fabric 120 interface (not shown in FIG. 1.) Respective memory allocation devices 111c-118c and processors 111a-118a (if present) are operatively coupled via local, to the respective system node 111-118, interface that is not shown in FIG. 1. Respective memories 111b-118b may store respective operating systems and respective page tables. Processors 111a-118a (if present) may execute their respective operating systems. Processors 111a-118a (if present) and memory allocation devices 111c-118c may create, maintain, and/or update their respective page tables.

In an embodiment, a process running on a system node 111-118 may request an allocation of memory to store executable code and/or data. This request is typically made via a system procedure call to the operating system—which is itself a running process on a system node 111-118. In response, the operating system may return a virtual address that the process may use to access the requested allocation. However, the operating system may not immediately allocate one or more pages of physical memory 111b-118b in response to the allocation request from the process. Rather, the operating system may defer allocating physical memory pages until the process accesses a virtual memory address associated with the requested (and now received) allocation. This scheme of memory management may also be referred to as "demand paging" or "on-demand paging."

In the context of memory allocation, demand paging follows the general rule that pages of physical memory 111b-118b should only be allocated to virtual memory addresses if the executing process demands them. To achieve this, a system node 111-118 uses a page table type implementation. A page table maps logical memory (i.e., virtual addresses) to physical memory (i.e., physical addresses.) A page table may use, for example, a bitwise operator or other indicator to mark in the page table whether a virtual page (address) has been allocated a physical page (address.)

When a process tries to access a given virtual page, the following steps are generally followed: (1) the processor 111a-118a attempts to access the page using a virtual address; (2) if the page is valid (i.e., is currently allocated a physical address) then the processor 111a-118a continues processing the instruction as normal; (3) If the page is invalid (i.e., is not currently allocated a physical address) then a page-fault occurs; (4) in response to the page-fault, the operating system requests that the respective memory allocation device 111c-118c allocate a physical memory page and associate the corresponding physical address with the faulting virtual page; (5) in response to the request, the memory allocation device 111c-118c allocates the physical memory page and associates the corresponding physical address with the faulting virtual page by updating the page table in memory 111b-118b local to its respective node 111-118; and, (6) once the respective page table has been updated to reflect the association between the faulting virtual address and the newly allocated physical page address, the instruction that was interrupted by the page-fault is restarted by the processor 111a-118a.

As used herein, the descriptive term 'local' refers to whether accesses and/or communication between elements can be completed entirely within a system node 111-118 without the use of fabric 120. The descriptive term 'remote' refers to whether accesses and/or communication between given elements cannot be completed entirely within a system node 111-118 therefore must use fabric 120 for accesses and/or communication. Thus, for example, memory 111b is local memory 111b with respect to processor 111a because processor 111a and memory 111b reside on the same system node 111. Conversely, for example, memory 112b is remote memory 112b with respect to processor 111a because, since memory 112b is on system node 112, processor 111a must use fabric 120 to access and/or communicate with memory 112b.

In an embodiment, as described herein, a processor 111a-118a (if present) may, under the control of their operating system, request an allocation of physical memory from their respective memory allocation device 111c-118c. In response, the memory allocation device 111c-118c determines whether the allocation request is to be fulfilled with local physical memory 111b-118b residing on the same node or is to be fulfilled with remote physical memory 111b-118b residing on a different node 111-118. The memory allocation device 111c-118c may determine whether to allocate local memory 111b-118b versus remote memory 111b-118b based on a governing policy specified by its local operating system. This governing policy may include, for example, whether there is enough available (i.e., allocable) local memory 111b-118b to fulfill the request. Other factors and/or indicators such as the type of process (e.g., operating system process, user process, driver process, etc.) may also be considered by the governing policy.

If the memory allocation device 111c-118c determines the allocation request is to be fulfilled with local physical memory 111b-118b, memory allocation device 111c-118c, in cooperation with its local operating system updates its page tables in local memory 111b-118b to fulfill the allocation request using local memory 111b-118b.

If the memory allocation device 111c-118c determines the allocation request is to be fulfilled with remote physical memory 111b-118b, the memory allocation device 111c-118c transmits, via fabric 120 a secondary allocation request to another memory allocation device 111c-118c. The secondary allocation requests a remote allocation of memory using memory that is local to the other memory allocation device 111c-118c.

In response to the secondary allocation request, the remote memory allocation device 111c-118c transmits (via fabric 120) a system address to the requesting memory allocation device 111c-118c that the requesting memory allocation device 111c-118c may use to access the requested remote allocation in the other node' 111-118 memory 111b-118b. This system address may also be known as a "global fabric address" (GFA). If remote memory allocation device 111c-118c cannot (or determines not to) fulfill the secondary request, the remote memory allocation device 111c-118c may return an indicator to that effect. Thus, by returning a system address, the remote memory allocation device 111c-118c is indicating that there is sufficient local memory 111b-118b on its node available and reserved to fulfill the secondary allocation request.

Once the local memory allocation device 111c-118c has determined the allocation request is to be fulfilled with remote physical memory 111b-118b, the local memory allocation device 111c-118c selects, the other node 111-118 (or memory allocation device 111c-118c) that is to receive the secondary memory allocation request. In an embodiment, the local memory allocation device 111c-118c selects the other node 111-118 based on at least one performance indicator. The at least one performance indicator may be one or more, or a combination of: (1) latency between the local memory allocation device 111c-118c and a prospective remote allocation device 111c-118c; (2) availability of memory 111b-118b to be allocated by a prospective remote allocation device 111c-118c; (3) multi-path bandwidth between the local memory allocation device 111c-118c and a prospective remote allocation device 111c-118c; (4) data access patterns to local memory 111b-118b; (5) data access patterns between the local node 111-118 and remote memory 111b-118b in general; (6) data access patterns between the local node 111-118 and a prospective remote node 111-118; and, (7) fabric congestion. Fabric congestion may be monitored using explicit congestion notification from one or more of switches 255-256. The selection of the other node 111-118 may also be based on (either alone or in addition to the performance indicator described herein) system level policies and/or quality of service (QoS) requirements/factors These policies and factors may include, but are not limited to: allowed bandwidth limits, maximum latency limits, and, available memory on a prospective remote node.

Figure 2A:
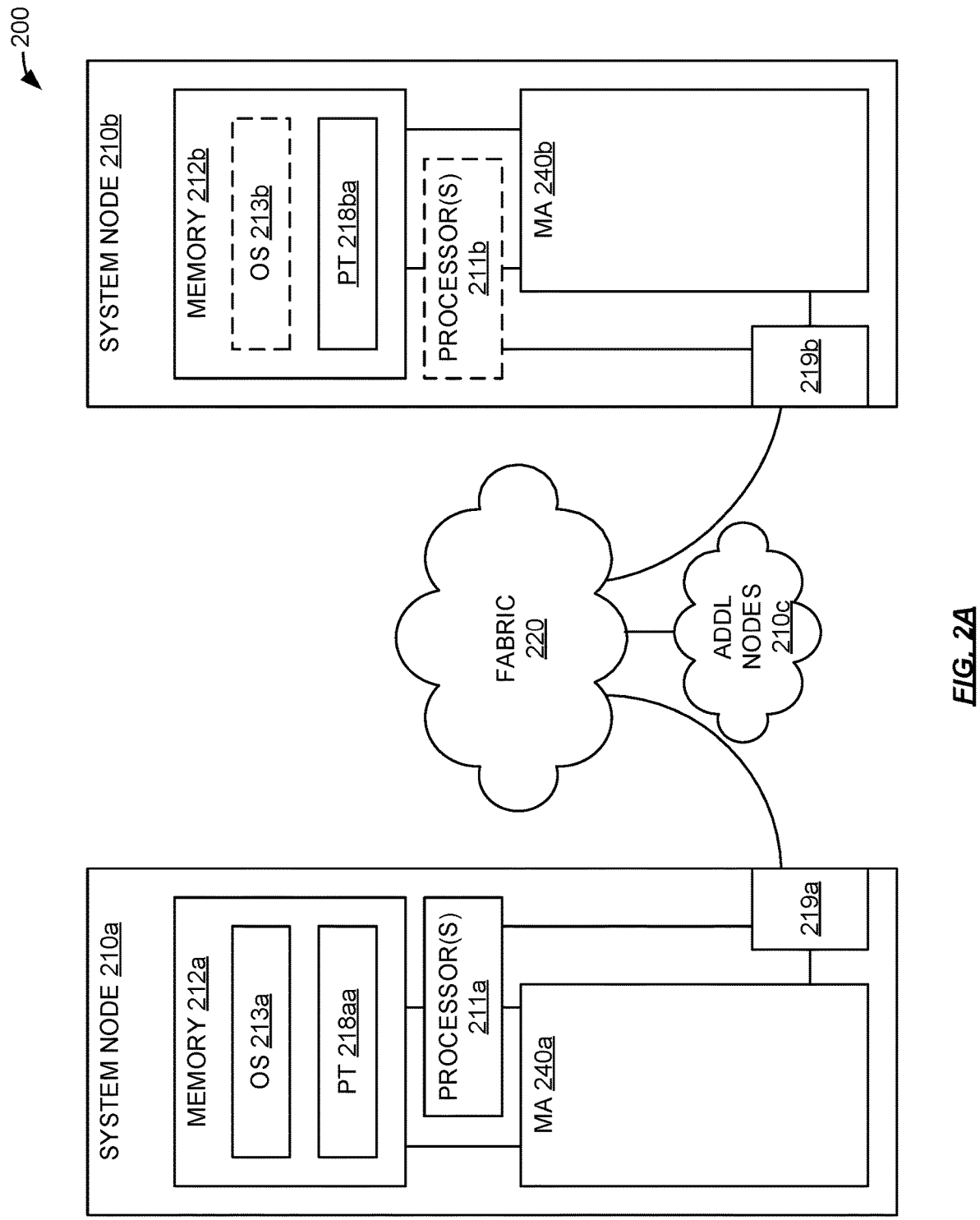
FIGS. 2A-2B are block diagrams illustrating an operation of a fabric interconnected processing system.
Figure 2B:
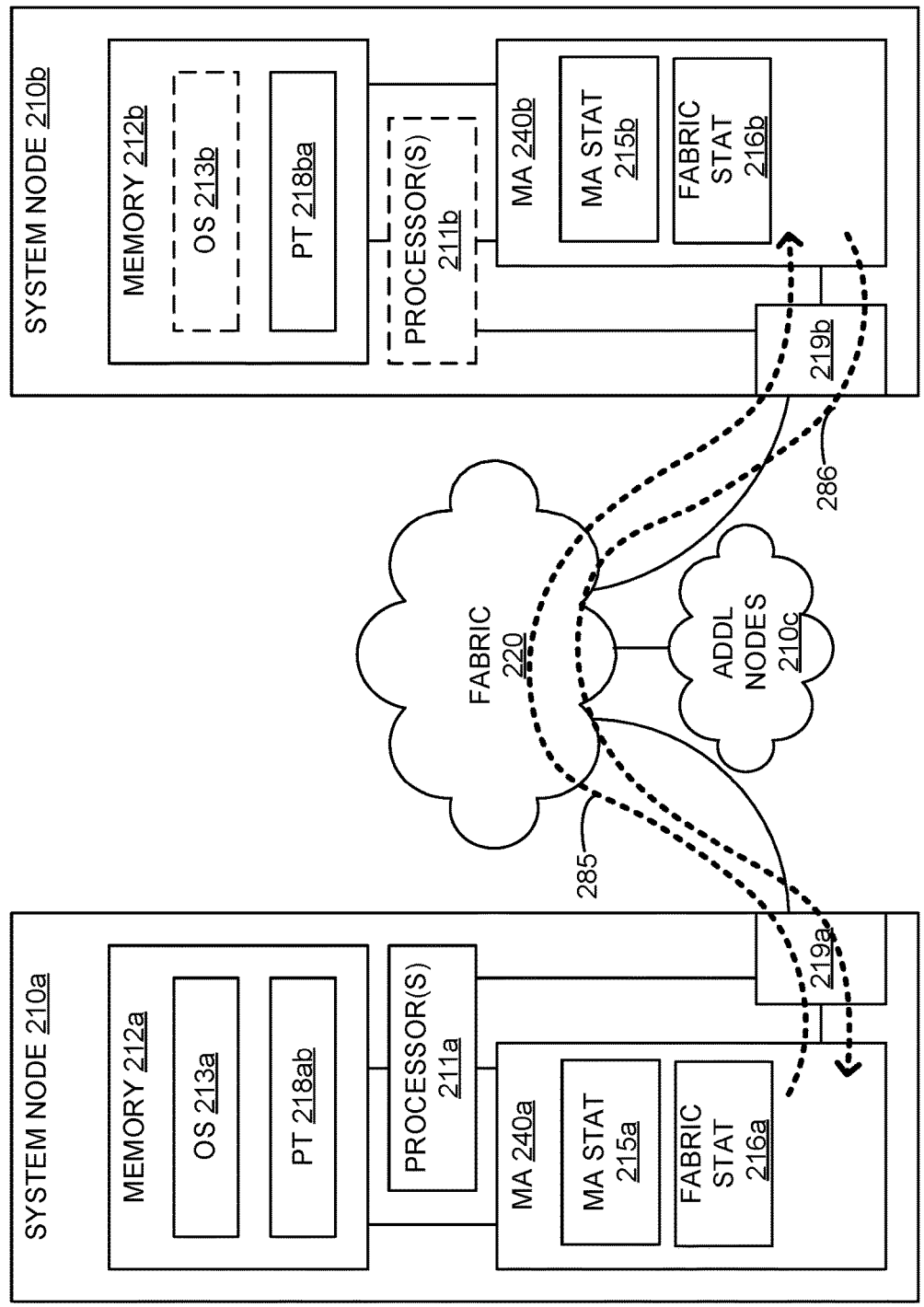

FIGS. 2A-2B are block diagrams illustrating an operation of a fabric interconnected processing system. In FIGS. 2A-2B, system 200 comprises system nodes 210a-210c, and fabric 220. System node 210a includes processor(s) 211a, memory 212a, memory allocation device 240a, and interface 219a. In FIG. 2A, memory 212a stores operating system 213a and a page table 218aa-218ab. System node 210b optionally includes processor(s) 211b. System node 210b optionally includes operating system 213b. System node 210b includes memory 212b, memory allocation device 240b, and interface 219b. Memory 212b may store operating system 213b and a page table 218ba-218bb. Additional system nodes 210c include similar or the same elements as system nodes 210a-210b and are therefore, for the sake of brevity, not discussed further herein with reference to FIGS. 2A-2B.

System nodes 210a-210c are operatively coupled to fabric 220. System nodes 210a-210c are operatively coupled to fabric 220 to communicate and/or exchange information etc. with each other. Fabric 220 may be or comprise a switched fabric, point-to-point connections, and/or other interconnect architectures (e.g., ring topologies, crossbars, etc.) Fabric 220 may include links, linking, and/or protocols that are configured to be cache coherent. For example, fabric 220 may use links, linking, and/or protocols that include functionality described by and/or are compatible with one or more of Compute Express Link (CXL), Coherent Accelerator Processor Interface (CAPI), and Gen-Z standards, or the like. In an embodiment, system nodes 210a-210c are operatively coupled to fabric 220 to load and/or store information from/to memory 212a-212b that resides within other system nodes 210a-210c.

In FIGS. 2A-2B, processor 211a of system node 210a is operatively coupled to memory 212a, memory allocation device 240a, and interface 219a. Memory allocation device 240a and processor 211a are operatively coupled via a local, to system node 210a, interface that is not shown in FIGS. 2A-2B. Memory allocation device 240a is operatively coupled to processor 211*a*, memory 212*a*, and interface 219*a*. Memory 212*a* may store operating system 213*a* and a page table 218*aa*-218*ab*. Processor 211*a* may execute operating system 213*a*. Similarly, processor 211*b* (if present) of system node 210*b* may be operatively coupled to memory 212*b*, memory allocation device 240*b*, and interface 219*b*. Memory allocation device 240*b* and processor 211*b* (if present) may be operatively coupled via a local, to system node 210*b*, interface that is not shown in FIGS. 2A-2B. Memory allocation device 240*b* may be operatively coupled to processor 211*b* (if present), memory 212*b*, and interface 219*b*. Memory 212*b* may store operating system 213*b* and a page table 218*ba*-218*bb*. Processor 211*b* (if present) may execute operating system 213*b*.

In an embodiment, a process running on system node 210*a* may request an allocation of memory to store executable code and/or data. This request is typically made via a system procedure call to operating system 213*a*—which is itself a running process on system node 210*a*. In response, operating system 213*a* may return a virtual address that the process may use to access the requested allocation. Because system 200 is configured to use demand paging, operating system 213*a* may not immediately allocate one or more pages of physical memory 212*a* in response to the allocation request from the process. Rather, operating system 213*a* may defer allocating physical memory pages until the process accesses a virtual memory address associated with the requested (and now received) allocation.

As discussed herein, in the context of memory allocation, demand paging follows the general rule that pages of physical memory 212*a* should only be allocated to virtual memory addresses if the executing process demands them. To achieve this system node 210*a* uses a page table type implementation. A page table 218*aa*-218*ab* maps logical memory (i.e., virtual addresses) to physical memory (i.e., physical addresses.) A page table 218*aa*-218*ab* may use a bitwise operator or other indicator to mark in page table 218*aa*-218*ab* whether a virtual page (address) has been allocated a physical page (address.)

When a process tries to access a given virtual page, the following steps are generally followed: (1) processor 211*a* attempts to access page using a virtual address; (2) if the page is valid (i.e., is currently allocated a physical address) then processor 211*a* continues processing the instruction as normal; (3) If the page is invalid (i.e., is not currently allocated a physical address) then a page-fault occurs; (4) in response to the page-fault, operating system 213*a* requests that memory allocation device 240*a* allocate a physical memory page and associate the corresponding physical address with the faulting virtual page; (5) in response to the request, memory allocation device 240*a* allocates the physical memory page and associates the corresponding physical address with the faulting virtual page by updating a page table 218*aa*-218*ab*; and, (6) once a page table 218*aa*-218*ab* has been updated to reflect the association between the faulting virtual address and the newly allocated physical page address, the instruction that was interrupted by the page-fault is restarted by processor 211*a*. Processor 211*b* (if present), operating system 213*b* (if present), and memory allocation device 240*b* may perform similar functions for system node 210*b*.

In an embodiment, processor 211*a* may, under the control of operating system 213*a*, request an allocation of physical memory from memory allocation device 240*a*. In response, memory allocation device 240*a* determines whether the allocation request is to be fulfilled with local physical memory 212*a* or is to be fulfilled with remote physical memory 212*b*. Memory allocation device 240*a* may determine whether to allocate local memory 212*a* versus remote memory 212*b* based on a governing policy specified by operating system 213*a*. This governing policy may include, for example, whether there is enough available (i.e., allocable) local memory 212*a* to fulfill the request. Other factors and/or indicators such as the type of process (e.g., operating system 213*a* process, user process, driver process, etc.) may also be considered by the governing policy.

If memory allocation device 240*a* determines the allocation request is to be fulfilled with local physical memory 212*a*, memory allocation device 240*a*, in cooperation with operating system 213*a*, updates page table 218*aa* to fulfill the allocation request using local memory 212*a*.

If memory allocation device 240*a* determines the allocation request is to be fulfilled with remote physical memory 212*b*, memory allocation device 240*a* selects a remote system node 210*b*-210*c* to transmit the remote allocation request to.

In an embodiment, the memory allocation device 240*a* selects the remote system node 210*b*-210*c* based on at least one performance indicator. The at least one performance indicator may be one or more, or a combination of: (1) latency between the memory allocation device 240*a* and a prospective remote allocation device 240*b*-240*c*; (2) availability of memory 212*b* to be allocated by a prospective remote allocation device 240*b*-240*c*; (3) multi-path bandwidth between memory allocation device 240*a* and a prospective remote allocation device 240*b*-240*c*; (4) data access patterns to local memory 212*a*; (5) data access patterns between the local system node 210*a* and remote memory 212*b*, in general; (6) data access patterns between system node 210*a* and a prospective remote system node 210*a*-210*c*; and, (7) fabric congestion. Fabric congestion may be monitored using explicit congestion notification from one or more of switches within fabric 220. The selection of the other system node 210*b*-210*c* may also be based on (either alone or in addition to the performance indicator described herein) system level policies and/or quality of service (QoS) requirements/factors These policies and factors may include, but are not limited to: allowed bandwidth limits, maximum latency limits, and, available memory on a prospective remote node.

To evaluate the at least one performance indicator, memory allocation devices 240*a*-240*b* may maintain statistics or other indicators relating to the performance of the fabric and/or memory allocation devices 240*a*-240*b*. This is illustrated in FIG. 2B by memory allocation statistics 215*a*-215*b* and fabric statistics 216*a*-216*b*. These statistics may include one or more of the performance indicators discussed herein.

Once memory allocation device selects, based on the at least one performance indicator, remote system node 210*b* to fulfill the remote allocation request, memory allocation device 240*a* transmits (via interface 219*a*, fabric 220, and interface 219*b*) a remote allocation request to memory allocation device 240*b*. The remote allocation requests a remote (to memory allocation device 240*a*) allocation of memory using memory 212*b* that is local to memory allocation device 240*b*. This is illustrated in FIG. 2B by arrow 285.

In response to the remote allocation request, memory allocation device 240*b* may transmit (via interface 219*b*, fabric 220, and interface 219*a*) a system address to memory allocation device 240*a* that memory allocation device 240*a* may use to access the requested allocation of memory in memory 212*b*. This system address may also be known as a "global fabric address" (GFA). If memory allocation device 240*b* cannot (or determines not to) fulfill the secondary request, memory allocation device 240*b* may return an indicator to that effect. For example, if memory allocation device 240*b* determines that the free space available in memory 212*b* is too low (i.e., below a threshold amount), memory allocation device 240*b* may refuse the request for a remote memory allocation. Likewise, if memory allocation device 240*b* determines that some other performance indicator from memory allocation statistics 215*a*-215*b* and fabric statistics 216*a*-216*b* meets or does not meet (as appropriate) a threshold criteria, memory allocation device 240*b* may refuse the request for a remote memory allocation. Thus, by returning a system address, memory allocation device 240*b* is indicating that there is at least sufficient memory 212*b* and/or bandwidth available and reserved to fulfill the secondary allocation request. This is illustrated in FIG. 2B by arrow 286.

FIG. 3 is a flowchart illustrating a method of operating memory allocation device. One or more steps illustrated in FIG. 3 may be performed by, for example, system 100, system 200, and/or their components. Via first interface and from a first processor that is local with respect to a first memory allocation device, a first request is received where the first request to be fulfilled by one of a first allocation of physical memory that is local with respect to the first processor and a second allocation that is not local with respect to the first processor (302). For example, processor 211*a* may, under the control of operating system 213*a*, request an allocation of physical memory from memory allocation device 240*a*. In response, memory allocation device 240*a* may determine that the allocation request is to be fulfilled with remote physical memory 212*b*. Memory allocation device 240*a* may determine the allocation request is to be fulfilled with remote physical memory 212*b* based on a governing policy specified by operating system 213*a*. This governing policy may include, for example, whether there is enough available (i.e., allocable) local memory 212*a* to fulfill the request. Other factors and/or indicators such as the type of process (e.g., operating system 213*a* process, user process, driver process, etc.) may also be considered by the governing policy.

Based on a first performance indicator, a second memory allocation device that is not local with respect to the first processor is selected to provide the second allocation of memory (304). For example, memory allocation device 240*a* may select system node 210*b* to provide the remote memory allocation based on one or more memory allocation statistics 215*a* and/or fabric statistics 216*a* maintained by memory allocation device 240*a*.

FIG. 4 is a flowchart illustrating a method of acknowledging a request for a remote memory allocation. One or more steps illustrated in FIG. 4 may be performed by, for example, system 100, system 200, and/or their components. Via a first interface and from a first processor that is local with respect to a memory allocation device, a first request is received, where the first request is to be fulfilled by one of a first allocation of physical memory that is local with respect to the first processor and a second allocation that is not local with respect to the first processor (402). For example, processor 211*a* may, under the control of operating system 213*a*, request an allocation of physical memory from memory allocation device 240*a*. In response, memory allocation device 240*a* may determine that the allocation request is to be fulfilled with remote physical memory 212*b*. Memory allocation device 240*a* may determine the allocation request is to be fulfilled with remote physical memory 212*b* based on a governing policy specified by operating system 213*a*.

Based on a first performance indicator, a second memory allocation device that is not local with respect to the first processor is selected to provide the second allocation of memory (404). For example, memory allocation device 240*a* may select system node 210*b* to provide the remote memory allocation based on one or more memory allocation statistics 215*a* and/or fabric statistics 216*a* maintained by memory allocation device 240*a*. Via a second interface and to the second memory allocation device, a second request that is for the second allocation of memory that is local with respect to the second memory allocation device is transmitted (406). For example, memory allocation device 240*a* may transmit (via interface 219*a*, fabric 220, and interface 219*b*) a remote allocation request to memory allocation device 240*b*. This remote allocation request may be for a remote (to memory allocation device 240*a*) allocation of memory using memory 212*b* that is local to memory allocation device 240*b*.

Based on a second performance indicator local to the second memory allocation device and by the second memory allocation device, a system address is transmitted to be used to access the second allocation of memory (408). For example, in response to the remote allocation request and determining that the free space available in memory 212*b* is sufficient and reserved (e.g., above a threshold amount), memory allocation device 240*b* may respond to the request for a remote memory allocation with a system address.

FIG. 5 is a flowchart illustrating a method of declining a request for a remote memory allocation. One or more steps illustrated in FIG. 5 may be performed by, for example, system 100, system 200, and/or their components. By a first memory allocation device and from a second memory allocation device that is not local with respect to the first memory allocation device, a first request for an allocation of memory that is local with respect to the first memory allocation device is received (502). For example, memory allocation device 240*b* may receive, from memory allocation device 240*a*, a request for an allocation of memory 212*b*.

Based on a first performance indicator and by the second memory allocation device, an indicator that the first memory allocation device will not provide the allocation of memory is transmitted (504). For example, memory allocation device 240*b* may, based on one or more memory allocation statistics 215*b* and/or fabric statistics 216*b* (e.g., congestion, latency) maintained by memory allocation device 240*b*, determine not to provide memory allocation device 240*a* with the requested remote allocation.

The methods, systems and devices described above may be implemented in computer systems, or stored by computer systems. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of system 100, and/or system 200, and their components. These software descriptions may be: behavioral, register transfer, logic component, transistor, and layout geometry-level descriptions. Moreover, the software descriptions may be stored on storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Note that physical files may be implemented on machine-readable media such as: 4 mm magnetic tape, 8 mm magnetic tape, 3-½ inch floppy media, CDs, DVDs, and so on.

Figure 6:
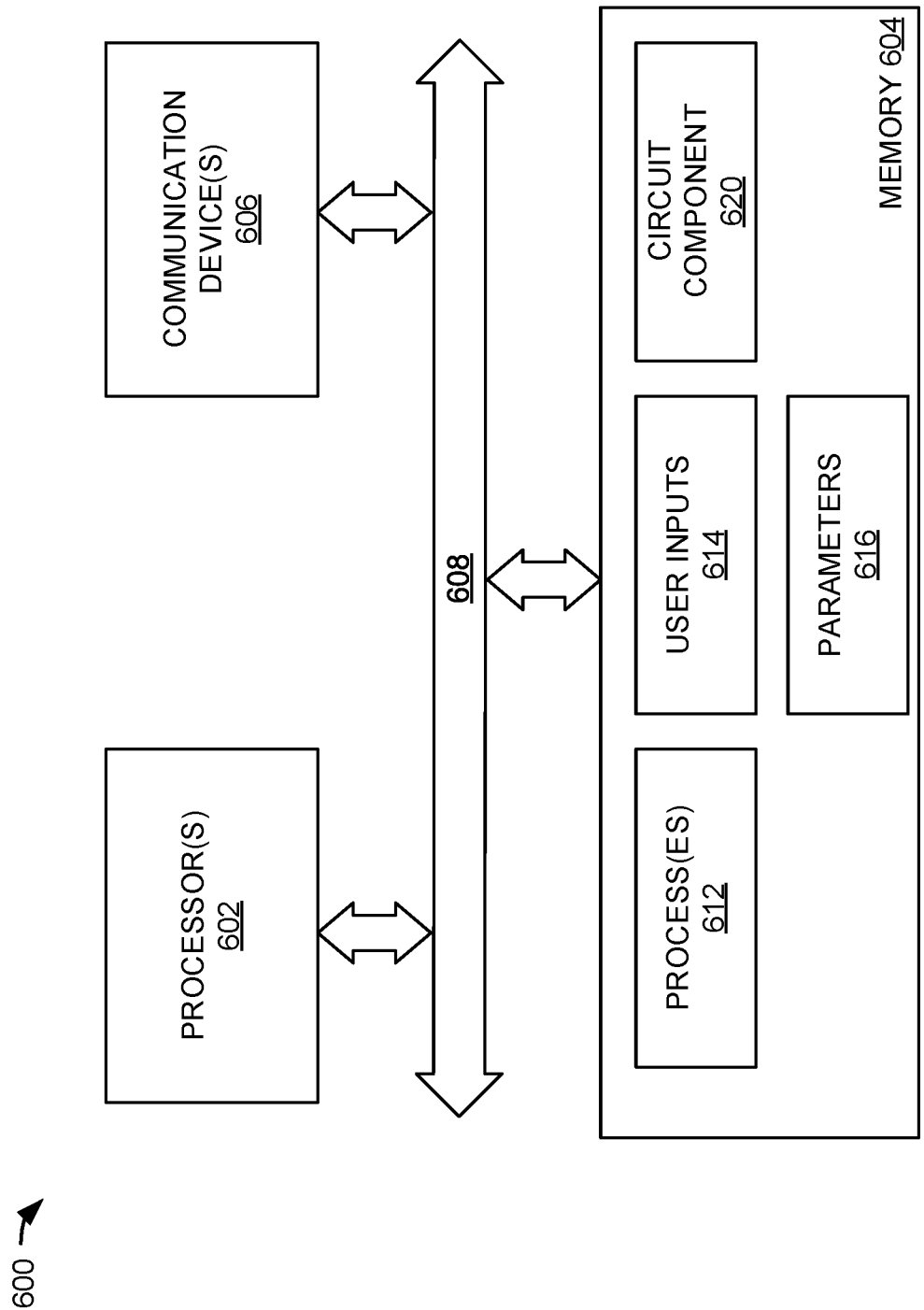
FIG. 6 is a block diagram illustrating a processing system.

FIG. 6 is a block diagram illustrating one embodiment of a processing system 600 for including, processing, or generating, a representation of a circuit component 620. Processing system 600 includes one or more processors 602, a memory 604, and one or more communications devices 606. Processors 602, memory 604, and communications devices 606 communicate using any suitable type, number, and/or configuration of wired and/or wireless connections 608.

Processors 602 execute instructions of one or more processes 612 stored in a memory 604 to process and/or generate circuit component 620 responsive to user inputs 614 and parameters 616. Processes 612 may be any suitable electronic design automation (EDA) tool or portion thereof used to design, simulate, analyze, and/or verify electronic circuitry and/or generate photomasks for electronic circuitry. Representation 620 includes data that describes all or portions system 100, and/or system 200, and their components, as shown in the Figures.

Representation 620 may include one or more of behavioral, register transfer, logic component, transistor, and layout geometry-level descriptions. Moreover, representation 620 may be stored on storage media or communicated by carrier waves.

Data formats in which representation 620 may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email User inputs 614 may comprise input parameters from a keyboard, mouse, voice recognition interface, microphone and speakers, graphical display, touch screen, or other type of user interface device. This user interface may be distributed among multiple interface devices. Parameters 616 may include specifications and/or characteristics that are input to help define representation 620. For example, parameters 616 may include information that defines device types (e.g., NFET, PFET, etc.), topology (e.g., block diagrams, circuit descriptions, schematics, etc.), and/or device descriptions (e.g., device properties, device dimensions, power supply voltages, simulation temperatures, simulation models, etc.).

Memory 604 includes any suitable type, number, and/or configuration of non-transitory computer-readable storage media that stores processes 612, user inputs 614, parameters 616, and circuit component 620.

Communications devices 606 include any suitable type, number, and/or configuration of wired and/or wireless devices that transmit information from processing system 600 to another processing or storage system (not shown) and/or receive information from another processing or storage system (not shown). For example, communications devices 606 may transmit circuit component 620 to another system. Communications devices 606 may receive processes 612, user inputs 614, parameters 616, and/or circuit component 620 and cause processes 612, user inputs 614, parameters 616, and/or circuit component 620 to be stored in memory 604.

Implementations discussed herein include, but are not limited to, the following examples:

Example 1: A memory allocation device, comprising: a first interface to receive, from a first processor that is local with respect to the memory allocation device, a first request, the first request to be fulfilled by one of a first allocation of physical memory that is local with respect to the first processor and a second allocation of memory that is not local with respect to the first processor; first circuitry configured to select, based on at least one performance indicator, a second memory allocation device that is not local with respect to the first processor to provide the second allocation of memory; and, a second interface to transmit, to the second memory allocation device, a second request, the second request to be for the second allocation of memory that is local with respect to the second memory allocation device , the second interface to receive, from the second memory allocation device, a system address to be used to access the second allocation of memory.

Example 2: The memory allocation device of example 1, wherein the at least one performance indicator includes a fabric distance between the memory allocation device and the second memory allocation device.

Example 3: The memory allocation device of example 1, wherein the at least one performance indicator is based on an access latency measured between the memory allocation device and the second memory allocation device.

Example 4: The memory allocation device of example 1, wherein the at least one performance indicator is based on an indicator of fabric congestion.

Example 5: The memory allocation device of example 1, wherein the at least one performance indicator is based on a fabric usage pattern.

Example 6: The memory allocation device of example 1, wherein the second memory allocation device is configured to delay transmitting the system address based on a congestion indicator meeting a threshold criteria.

Example 7: The memory allocation device of example 1, wherein the second memory allocation device is configured to transmit and indicator that the second request has failed based on a congestion indicator meeting a threshold criteria.

Example 8: A memory allocation device, comprising: first circuitry configured to receive a first performance indicator; a first interface to receive, from a first processor that is local with respect to the memory allocation device, a first request, the first request to be fulfilled by one of a first allocation of physical memory that is local with respect to the first processor and a second allocation of memory that is not local with respect to the first processor; and, second circuitry configured to select, based at least on the first performance indicator, a second memory allocation device to provide the second allocation of memory, the second memory allocation device not being local with respect to the memory allocation device.

Example 9: The memory allocation device of example 8, further comprising: a second interface to transmit, to the second memory allocation device, a second request, the second request to be for the second allocation of memory that is local with respect to the second memory allocation device.

Example 10: The memory allocation device of example 9, wherein the second memory allocation device is to transmit, based at least on a second performance indicator, a system address to be used to access the second allocation of memory.

Example 11: The memory allocation device of example 10, wherein the second performance indicator is based on a congestion of a link between the memory allocation device and the second memory allocation device.

Example 12: The memory allocation device of example 10, wherein the second performance indicator is based on an amount of free memory available to the second memory allocation device.

Example 13: The memory allocation device of example 10, wherein the second performance indicator is based on an amount of latency between the memory allocation device and the second memory allocation device.

Example 14: The memory allocation device of example 10, wherein the second performance indicator is based on an amount of communication bandwidth between the memory allocation device and the second memory allocation device meeting a threshold criteria.

Example 15: A method of operating a system, comprising: receiving, via a first interface and from a first processor that is local with respect to a first memory allocation device, a first request, the first request to be fulfilled by one of a first allocation of physical memory that is local with respect to the first processor and a second allocation of memory that is not local with respect to the first processor; and, based on a first performance indicator, selecting a second memory allocation device that is not local with respect to the first processor to provide the second allocation of memory.

Example 16: The method of example 15, further comprising: transmitting, via a second interface and to the second memory allocation device, a second request, the second request to be for the second allocation of memory that is local with respect to the second memory allocation device.

Example 17: The method of example 16, further comprising: based on a second performance indicator local to the second memory allocation device meeting a threshold criteria, transmitting, by the second memory allocation device, a system address to be used to access the second allocation of memory.

Example 18: The method of example 16, further comprising: based on a second performance indicator local to the second memory allocation device meeting a threshold criteria, transmitting, by the second memory allocation device, an indicator that the second memory allocation device will not provide the second allocation of memory.

Example 19: The method of example 18, wherein the second performance indicator is at least one of an amount of memory available to the second memory allocation device, a latency between the first memory allocation device and the second memory allocation device, and a bandwidth usage indicator associated with the second memory allocation device.

Example 20: The method of example 15, wherein the first performance indicator is at least one of a fabric distance between the first memory allocation device and the second memory allocation device, an access latency measured between the first memory allocation device and the second memory allocation device, an indicator of fabric congestion, and a fabric usage pattern.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A memory allocation device, comprising:
   a first interface to receive, from a first processor that is local with respect to the memory allocation device, a first request, the first request to be fulfilled by one of a first allocation of physical memory that is local with respect to the first processor and a second allocation of memory that is not local with respect to the first processor;
   first circuitry configured to select, based on at least one performance indicator, a second memory allocation device that is not local with respect to the first processor to provide the second allocation of memory; and,
   a second interface to transmit, to the second memory allocation device, a second request, the second request to be for the second allocation of memory that is local with respect to the second memory allocation device, the second interface to receive, from the second memory allocation device, an indicator that free space in the memory that is local with respect to the second memory device is sufficient and reserved for the second allocation of memory.

2. The memory allocation device of claim 1, wherein the at least one performance indicator includes a fabric distance between the memory allocation device and the second memory allocation device.

3. The memory allocation device of claim 1, wherein the at least one performance indicator is based on an access latency measured between the memory allocation device and the second memory allocation device.

4. The memory allocation device of claim 1, wherein the at least one performance indicator is based on an indicator of fabric congestion.

5. The memory allocation device of claim 1, wherein the at least one performance indicator is based on a fabric usage pattern.

6. The memory allocation device of claim 1, wherein the second memory allocation device is configured to delay transmitting the system address based on a congestion indicator meeting a threshold criteria.

7. The memory allocation device of claim 1, wherein the second memory allocation device is configured to transmit and indicator that the second request has failed based on a congestion indicator meeting a threshold criteria.

8. A memory allocation device, comprising:
   first circuitry configured to receive a first performance indicator;
   a first interface to receive, from a first processor that is local with respect to the memory allocation device, a first request, the first request to be fulfilled by one of a first allocation of physical memory that is local with respect to the first processor and a second allocation of memory that is not local with respect to the first processor; and
   second circuitry configured to select, based at least on the first performance indicator, a second memory allocation device to provide the second allocation of memory, the second memory allocation device not being local with respect to the memory allocation device, the second memory allocation device to transmit an indicator that an amount of memory available to the second memory allocation device is reserved for the second allocation of memory.

9. The memory allocation device of claim 8, further comprising:
a second interface to transmit, to the second memory allocation device, a second request, the second request to be for the second allocation of memory that is local with respect to the second memory allocation device.

10. The memory allocation device of claim 9, wherein the second memory allocation device is to transmit, based at least on a second performance indicator, a system address to be used to access the second allocation of memory.

11. The memory allocation device of claim 10, wherein the second performance indicator is based on a congestion of a link between the memory allocation device and the second memory allocation device.

12. The memory allocation device of claim 10, wherein the second performance indicator is based on an amount of free memory available to the second memory allocation device.

13. The memory allocation device of claim 10, wherein the second performance indicator is based on an amount of latency between the memory allocation device and the second memory allocation device.

14. The memory allocation device of claim 10, wherein the second performance indicator is based on an amount of communication bandwidth between the memory allocation device and the second memory allocation device meeting a threshold criteria.

15. A method of operating a system, comprising:
receiving, via a first interface and from a first processor that is local with respect to a first memory allocation device, a first request, the first request to be fulfilled by one of a first allocation of physical memory that is local with respect to the first processor and a second allocation of memory that is not local with respect to the first processor;
based on a first performance indicator, selecting a second memory allocation device that is not local with respect to the first processor to provide the second allocation of memory;
transmitting, via a second interface and to the second memory allocation device, a second request, the second request to be for the second allocation of memory that is local with respect to the second memory allocation device; and
transmitting, by the second memory allocation device, a first indicator that an amount of memory available to the second memory allocation device is reserved for the second allocation of memory.

16. The method of claim 15, further comprising:
receiving, via the second interface and from the second memory allocation device, a global fabric address corresponding to the second allocation of memory that is local with respect to the second memory allocation device.

17. The method of claim 16, wherein the transmitting, by the second memory allocation device, of the first indicator that the amount of memory available to the second memory allocation device is reserved for the second allocation of memory is based on a second performance indicator local to the second memory allocation device meeting a threshold criteria.

18. The method of claim 16, further comprising:
based on a second performance indicator local to the second memory allocation device not meeting a threshold criteria, transmitting, by the second memory allocation device, a second indicator that the second memory allocation device will not provide a third allocation of memory.

19. The method of claim 18, wherein the second performance indicator is at least one of an amount of memory available to the second memory allocation device, a latency between the first memory allocation device and the second memory allocation device, and a bandwidth usage indicator associated with the second memory allocation device.

20. The method of claim 15, wherein the first performance indicator is based on a fabric distance between the first memory allocation device and the second memory allocation device.

* * * * *